(12) United States Patent
Wu et al.

(10) Patent No.: US 12,045,914 B2
(45) Date of Patent: Jul. 23, 2024

(54) IMAGE COLORING METHOD AND APPARATUS BASED ON ARTIFICIAL INTELLIGENCE, ELECTRONIC DEVICE, AND COMPUTER READABLE STORAGE MEDIUM

(71) Applicant: TENCENT TECHNOLOGY (SHENZHEN) COMPANY LIMITED, Shenzhen (CN)

(72) Inventors: Yanze Wu, Shenzhen (CN); Yu Li, Shenzhen (CN); Xintao Wang, Shenzhen (CN); Honglun Zhang, Shenzhen (CN); Xun Zhao, Shenzhen (CN); Ying Shan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 13 days.

(21) Appl. No.: 17/971,279

(22) Filed: Oct. 21, 2022

(65) Prior Publication Data
US 2023/0040256 A1 Feb. 9, 2023

Related U.S. Application Data

(63) Continuation of application No. PCT/CN2022/072298, filed on Jan. 17, 2022.

(30) Foreign Application Priority Data

Jan. 20, 2021 (CN) .......................... 202110075873.9

(51) Int. Cl.
*G06T 11/00* (2006.01)
*G06T 3/02* (2024.01)

(52) U.S. Cl.
CPC .............. *G06T 11/001* (2013.01); *G06T 3/02* (2024.01)

(58) Field of Classification Search
None
See application file for complete search history.

(56) References Cited

U.S. PATENT DOCUMENTS 9,478,040 B2 * 10/2016 Jumpasut ................ G06T 7/194
2007/0014473 A1 * 1/2007 Slabaugh ............. G06V 10/754
382/173

(Continued)

FOREIGN PATENT DOCUMENTS

| CN | 108921916 A | 11/2018 |
| CN | 111583097 A | 8/2020 |
| CN | 113570678 A | 10/2021 |

OTHER PUBLICATIONS

The World Intellectual Property Organization (WIPO) International Search Report for PCT/CN2022/072298 Mar. 25, 2022 6 Pages (including translation).

(Continued)

*Primary Examiner* — Martin Mushambo
(74) *Attorney, Agent, or Firm* — ANOVA LAW GROUP, PLLC

(57) ABSTRACT

An image coloring method includes: acquiring first color a priori information about an image-to-be-colored; transforming the first color a priori information to obtain second color a priori information aligned with the image-to-be-colored; downsampling the image-to-be-colored to obtain a first image feature; performing modulation coloring processing on the first image feature based on the second color a priori information to obtain a second image feature; and upsampling the second image feature based on the second color a priori (Continued)

priori information to obtain a first colored image, where the first colored image is aligned with the image-to-be-colored.

20 Claims, 8 Drawing Sheets

(56) References Cited

U.S. PATENT DOCUMENTS

| | | |
|---|---|---|
| 2015/0269747 A1 | 9/2015 | Hogan et al. |
| 2021/0133430 A1* | 5/2021 | Yang Mao ................ G06T 5/50 |
| 2022/0108542 A1* | 4/2022 | Zhang .................. G06V 10/803 |

OTHER PUBLICATIONS

Wenfei Niu, "Research on Image Segmentation Methods Based on Shape Priors and Graph Cuts", Mar. 15, 2014, Information & Technology, China Master's Theses Full-Text Database.

* cited by examiner

IMAGE COLORING METHOD AND APPARATUS BASED ON ARTIFICIAL INTELLIGENCE, ELECTRONIC DEVICE, AND COMPUTER READABLE STORAGE MEDIUM

CROSS-REFERENCES TO RELATED APPLICATIONS

This application is a continuation application of PCT Patent Application No. PCT/CN2022/072298, entitled "ARTIFICIAL INTELLIGENCE-BASED IMAGE COLORING METHOD AND APPARATUS, ELECTRONIC DEVICE, COMPUTER READABLE STORAGE MEDIUM, AND COMPUTER PROGRAM PRODUCT" and filed on Jan. 17, 2022, which claims priority to Chinese Patent Application No. 202110075873.9, filed on Jan. 20, 2021, the entire contents of both of which are incorporated herein by reference.

FIELD OF THE TECHNOLOGY

The present disclosure relates to image processing technologies, and more particularly, to an image coloring method and apparatus based on artificial intelligence, electronic device, computer readable storage medium and computer program product.

BACKGROUND OF THE DISCLOSURE

Artificial intelligence (AI) is a comprehensive technology of computer science. Through studying the design principles and implementation methods of various intelligent machines, the machines have functions of perception, reasoning and decision-making. The artificial intelligence technology is a comprehensive discipline, involving a wide range of fields, such as a natural language processing technology and a machine learning/deep learning, etc. With the development of technology, the artificial intelligence technology will be applied to more fields and play an increasingly important value.

Image processing is an important application of artificial intelligence, and typically, corresponding colored images may be generated based on grayscale images. However, in related art, during the process of generating a colored image, it is prone to having the problems such as color bleeding and color fading; and as a result, the quality of the generated colored image is greatly affected, a color of the image has to be repaired again, and thus the image processing efficiency of the electronic device is weakened.

SUMMARY

The embodiments of the present disclosure provide an image coloring method and apparatus based on artificial intelligence, an electronic device, a computer readable storage medium and a computer program product, which can accurately color an image-to-be-colored, so that the image processing accuracy and the image processing efficiency of the electronic device are improved.

The technical solutions in the embodiments of the present disclosure are implemented as follows:

The embodiment of the present disclosure provide an image coloring method based on artificial intelligence, performed by the electronic device and including: acquiring first color a priori information about an image-to-be-colored; transforming the first color a priori information to obtain second color a priori information aligned with the image-to-be-colored; downsampling the image-to-be-colored to obtain a first image feature; performing modulation coloring processing on the first image feature based on the second color a priori information to obtain a second image feature; and upsampling the second image feature based on the second color a priori information to obtain a first colored image, the first colored image being aligned with the image-to-be-colored.

The embodiments of the present disclosure provide an image coloring apparatus based on artificial intelligence, including: an acquisition module configured to acquire first color a priori information about an image-to-be-colored; a transformation module configured to transform the first color a priori information to obtain second color a priori information aligned with the image-to-be-colored; and a processing module configured to downsample the image-to-be-colored to obtain a first image feature, configured to perform modulation coloring processing on the first image feature based on the second color a priori information to obtain a second image feature and configured to upsample the second image feature based on the second color a priori information to obtain a first colored image, where the first colored image is aligned with the image-to-be-colored.

An embodiment of the present disclosure provides an electronic device, including: a memory, configured to store executable instructions; and a processor, configured to perform the image coloring method based on artificial intelligence provided in the embodiments of the present disclosure when executing the executable instructions stored in the memory.

An embodiment of the present disclosure provides a non-transitory computer-readable storage medium storing executable instructions, the executable instructions, when executed by a processor, implementing the image coloring method based on artificial intelligence provided in this embodiment of the present disclosure.

This embodiment of the present disclosure has the following beneficial effects:

The second color a priori information aligned with the image-to-be-colored is determined, and modulation coloring processing and upsampling processing are performed on the first image feature, corresponding to the image-to-be-colored, based on the second color a priori information to obtain the first colored image. Since the second color a priori information is aligned with the image-to-be-colored, the first colored image generated based on the second color a priori information is aligned with the image-to-be-colored; and in this way, the image-to-be-colored is accurately colored without a need for repairing a color of the image again, and thus the image processing accuracy and the image processing efficiency of the electronic device are improved.

DESCRIPTION OF EMBODIMENTS

Figure 1:
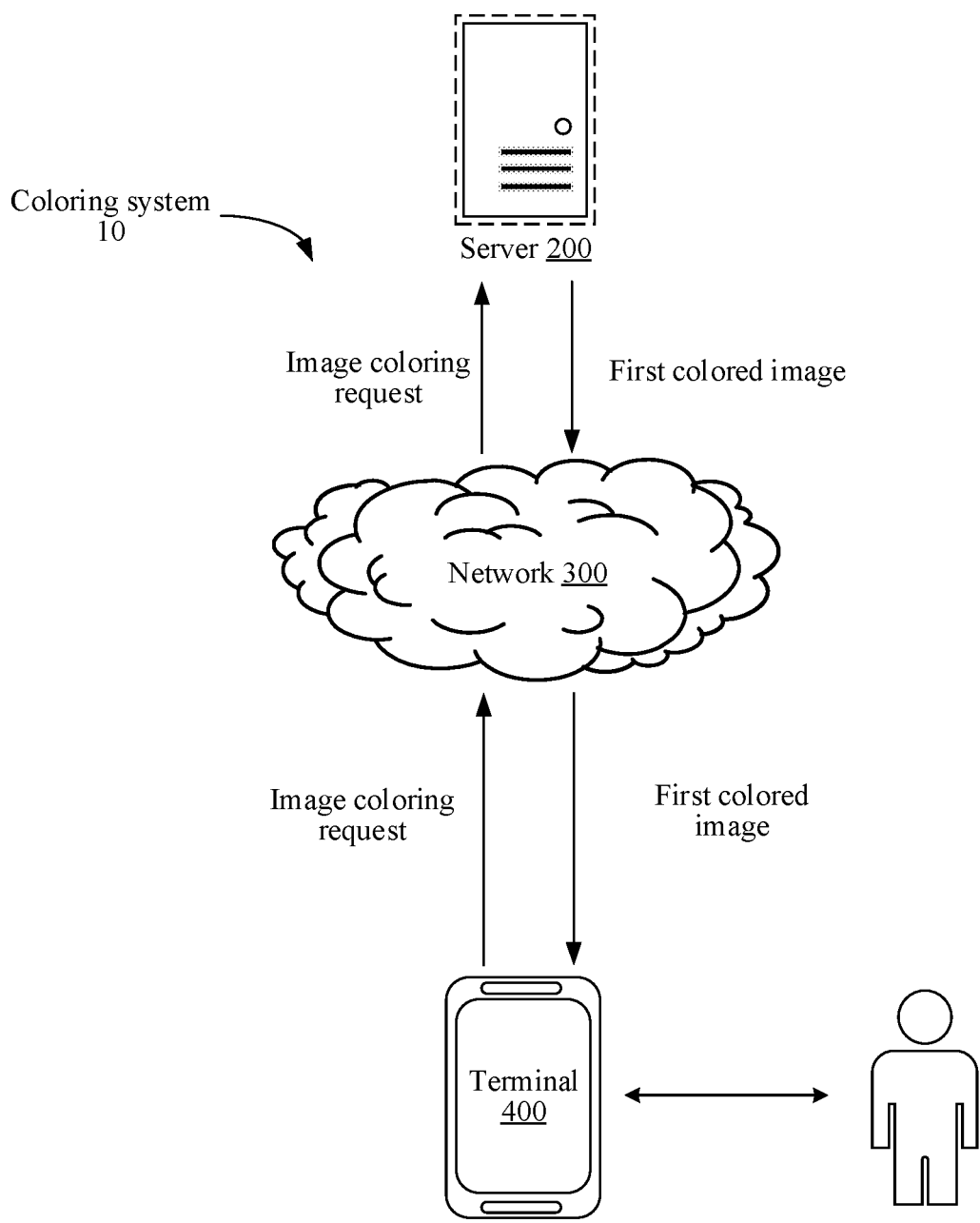
FIG. 1 is a schematic diagram of an architecture of a coloring system 10 based on artificial intelligence according to an embodiment of the present disclosure.

To make the objectives, technical solutions, and advantages of the present disclosure clearer, the following describes the present disclosure in further detail with reference to the accompanying drawings. The described embodiments are not to be considered as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in this specification are the same as those usually understood by a person skilled in the art to which the present disclosure belongs. Terms used in this specification are merely intended to describe objectives of the embodiments of the present disclosure, but are not intended to limit the present disclosure.

Before the embodiments of the present disclosure are further described in detail, a description is made on nouns and terms involved in the embodiments of the present disclosure, and the nouns and terms involved in the embodiments of the present disclosure are applicable to the following explanations.

1) Color a priori information: Color-related experiences and historical data that may be learned prior to processing an image may be expressed, for example, in a form of a feature map. For example, when a generative adversarial network is capable of generating a color-rich image, it is believed that the generative adversarial network contains sufficient color a priori information, and the color a priori information may be a feature map including features of an intermediate layer of the generative adversarial network.

2) Affine transformation: It is a linear transformation from a two-dimensional vector to another two-dimensional vector. Affine transformations may be achieved by a composite of a series of atomic transformations such as translation, scaling, flipping, rotation and shearing.

3) Generative adversarial network (GAN): It is a deep learning model, including a generator and a discriminator. The generator and the discriminator make mutual game learning to produce a properly good output, where the discriminator performs classification prediction based on an input variable, and the generator randomly generates observation data by certain given implicit information.

4) Foreground: It is a person or object in a lens in front of or near the front of a subject.

5) Downsampling: It refers to that a feature map is further compressed, and features are reduced by max pooling or average pooling, which is actually to filter features with small effect and redundant information and retain key information.

Image coloring is to stain a grayscale image with a color. In the associated art, the image is colored based on deep learning; and this method may be classified into two methods, one of which is fully automatic coloring and the other one of which is coloring based on a reference image. Fully automatic coloring has the advantages of simpleness and convenience; it only requires to design loss functions, and end-to-end only training and test may be performed; however, it is prone to generating defective colored images, for example, colored images with color bleeding and color fading. For coloring based on the reference image, it first requires to provide a colorful reference image having a similar content to the image-to-be-colored, and then a color of the reference image is transferred to the image-to-be-colored based on the matching condition of the two images. The effect of coloring based on the reference image largely depends on the quality of the reference image; if the two images have similar contents, the coloring effect can be good; however, if the two images are not similar, the coloring effect cannot good. Therefore, it takes a lot of effort to choose the reference image for coloring based on the reference image. Also, the both methods are difficult to achieve diversified coloring.

With regard to the above technical problems, the embodiments of the present disclosure provide an image coloring method and apparatus based on artificial intelligence, an electronic device, a computer readable storage medium and a computer program product, so than accurate and diversified coloring can be performed on the image-to-be-colored, and then the image processing accuracy and image processing efficiency of the electronic device are improved.

The following describes an exemplary application of the image coloring method based on artificial intelligence provided in the embodiments of the present disclosure, which may be implemented by various electronic devices, for example, by a terminal alone or by a server in cooperation with the terminal. For example, the terminal alone performs the image coloring method based on artificial intelligence described below, or the terminal and the server perform the image coloring method based on artificial intelligence described below, for example, the terminal sends the image-to-be-colored to the server, and the server performs the image coloring method based on artificial intelligence according to the received image-to-be-colored.

The electronic device used for image coloring provided in this embodiment of the present disclosure may be various types of terminal devices or servers, where the server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, or the like, but is not limited thereto. The terminal and the server may be directly or indirectly connected in a wired or wireless communication manner. This is not limited in the present disclosure.

With a server as an example, for example, it may be a server cluster deployed on a cloud and having an artificial intelligence cloud service (AI as a Service, AIaaS) opened to users; and in an AIaaS platform, several types of common AI services can be split, and independent or packaging services are provided on the cloud. This service mode is similar to an AI theme mall, and all users may access one or more artificial intelligence services provided using the AIaaS platform by an application programming interface.

For example, one of the artificial intelligence cloud services may be an image coloring service, that is an image coloring program provided in the embodiments of the present disclosure is encapsulated in a server in the cloud. In response to an image coloring trigger operation, a terminal sends an image coloring request carrying the image-to-be-colored to the server in the cloud; and the server in the cloud calls the encapsulated image coloring program, generates a first colored image based on the image-to-be-colored and returns the first colored image to the terminal, so that the terminal displays the first colored image.

In some embodiments, the server and the terminal cooperatively implement the image coloring method based on artificial intelligence provided in the embodiments of the present disclosure to illustrate an exemplary coloring system. FIG. 1 is a schematic diagram of an architecture of a coloring system 10 based on artificial intelligence according to an embodiment of the present disclosure. The terminal 400 is connected to the server 200 via a network 300 which may be a wide area network, a local area network or a combination of the both.

An electronic album runs on the terminal; the terminal 400 receives a repair operation of a user for a photograph (the image-to-be-colored), namely, the photograph requires to be colored; and the server 200 receives an image coloring request from the terminal 400, where the image coloring request carries the image-to-be-colored. In response to the image coloring request, the server 200 acquires first color a priori information about the image-to-be-colored, transforms the first color a priori information to obtain second color a priori information aligned with the image-to-be-colored, colors the image-to-be-colored via the second color a priori information to obtain a first colored image aligned with the image-to-be-colored and sends the first colored image to the terminal 400 so as to display the first colored image in the terminal 400. The image coloring method provided in the embodiments of the present disclosure may further color a video frame in a video file so as to realize video repair.

In some embodiments, with an electronic device provided in the embodiments of the present disclosure as an example, the terminal implements the image coloring method based on artificial intelligence provided in the embodiments of the present disclosure by running a computer program, and the computer program may be a native program or a software module in an operating system; may be a native application (APP), namely, an image coloring program based on artificial intelligence which can run only requiring to be installed in the operating system; and may also be an applet, namely, an image coloring applet based on artificial intelligence which only requires to be downloaded into the browser environment of any client to run. In general, the computer program may be an application, a module or a plug-in in any form.

Figure 2:
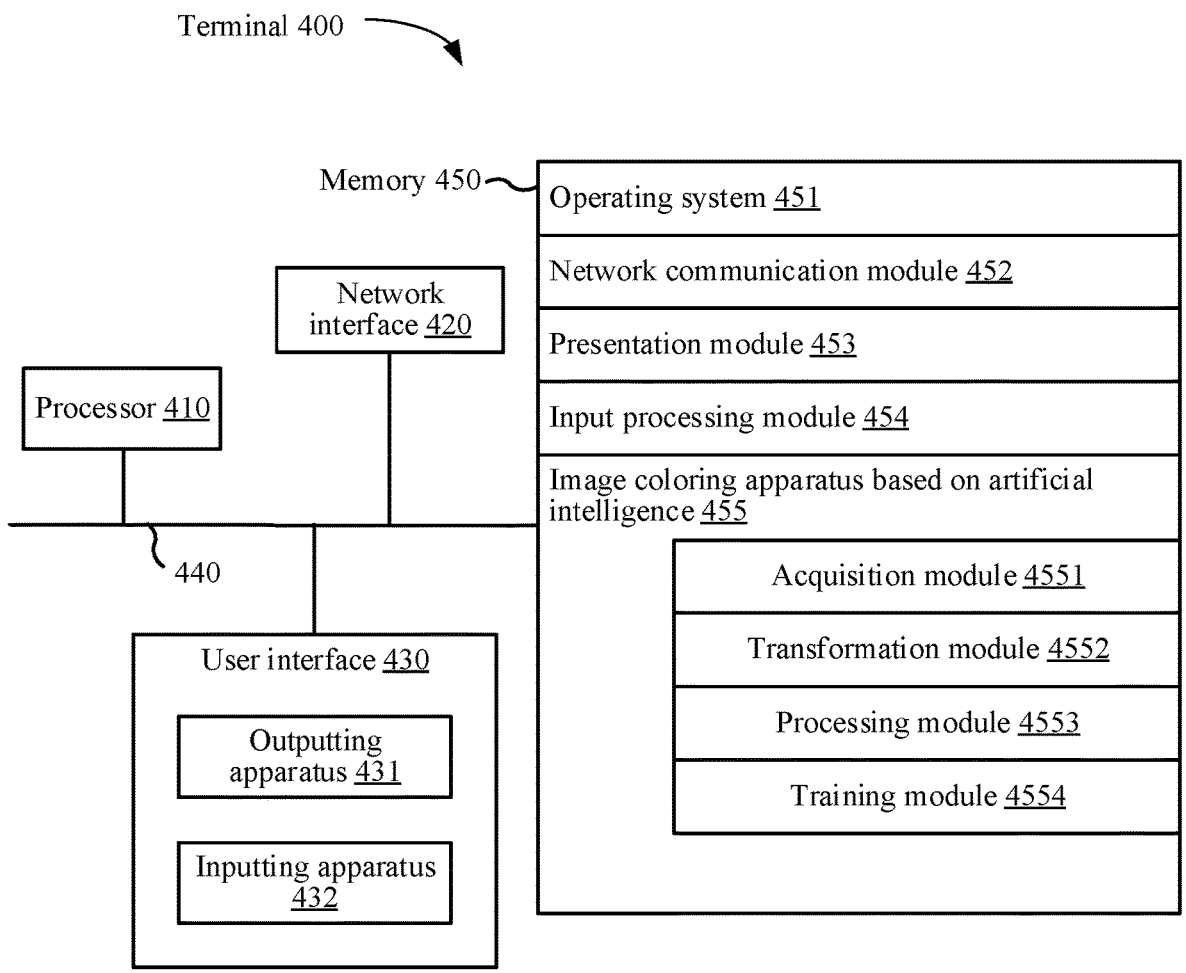
FIG. 2 is a schematic diagram of a structure of a terminal 400 according to an embodiment of the present disclosure.
Figure 3:
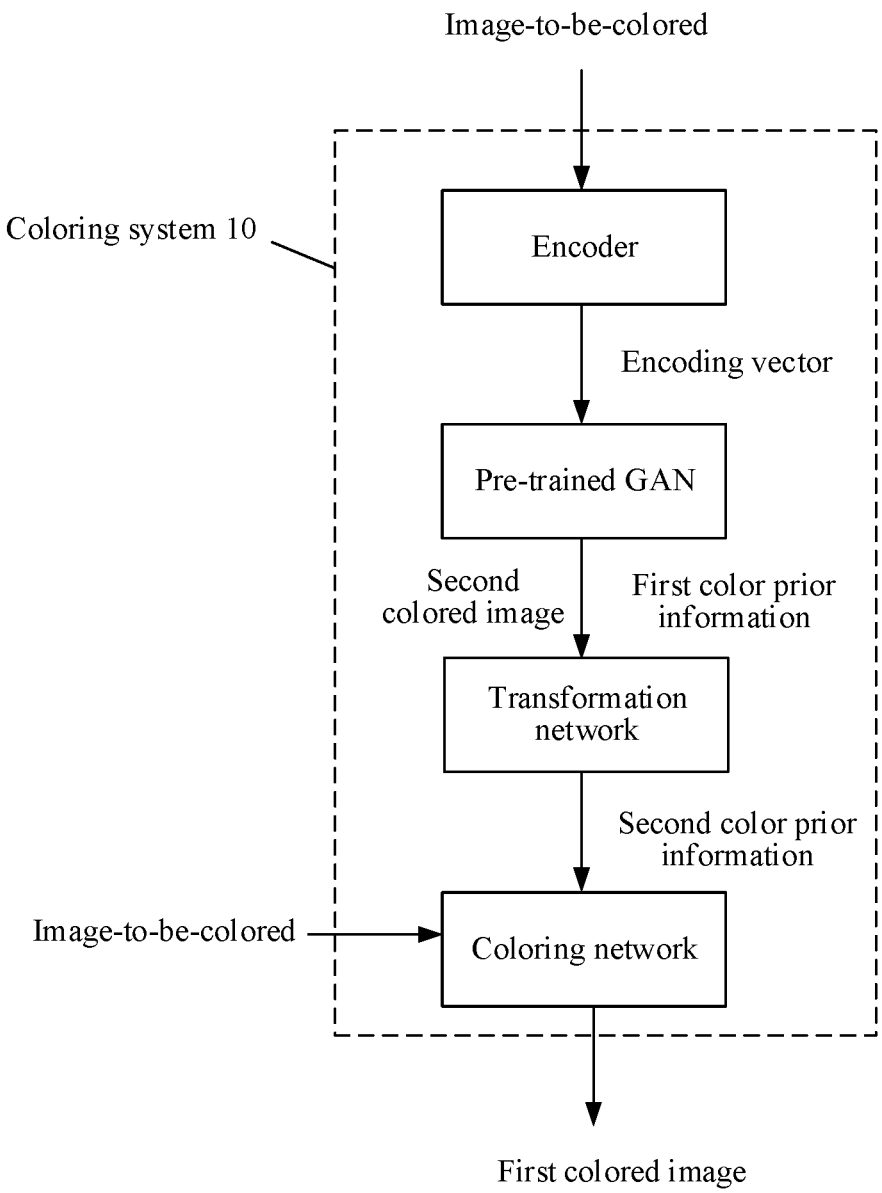
FIG. 3 is a schematic diagram of a constitution structure of a coloring system 10 according to an embodiment of the present disclosure.

The electronic device provided in the embodiments of the present disclosure will be described as an example of the terminal 400 described above. FIG. 2 is a schematic diagram of a structure of a terminal 400 according to an embodiment of the present disclosure. The terminal 400 shown in FIG. 2 includes: at least one processor 410, a memory 450, at least one network interface 420, and a user interface 430. All the components in the terminal 400 are coupled together by a bus system 440. It may be understood that the bus system 440 is configured to implement connection and communication between the components. In addition to a data bus, the bus system 440 further includes a power bus, a control bus, and a status signal bus. However, for ease of clear description, all types of buses in FIG. 3 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, or the like.

The user interface 430 includes one or more output apparatuses 431 that can display media content, including one or more speakers and/or one or more visual display screens. The user interface 430 further includes one or more input apparatuses 432, including a user interface component helping a user input, for example, a keyboard, a mouse, a microphone, a touch display screen, a camera, or another input button and control member.

The memory 450 may be a removable memory, a non-removable memory, or a combination thereof. Exemplary hardware devices include a solid-state memory, a hard disk drive, an optical disc driver, or the like. The memory 450 may include one or more storage devices physically away from the processor 410.

The memory 450 includes a volatile memory or a non-volatile memory, or may include a volatile memory and a non-volatile memory. The non-volatile memory may be a read-only memory (ROM), and the volatile memory may be a random access memory (RAM). The memory 450 described in the embodiments of the present disclosure is to include any other suitable type of memories.

In some embodiments, the first memory 450 can store data to support various operations, examples of which include programs, modules, and data structures, or subsets or supersets thereof, as illustrated below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A presentation module 453 is configured to display information by using an output apparatus 431 (for example, a display screen or a speaker) associated with one or more user interfaces 430 (for example, a user interface configured to operate a peripheral device and display content and information); and an input processing module 454 is configured to detect one or more user inputs or interactions from one of the one or more input apparatuses 432 and translate the detected input or interaction.

In some embodiments, an image coloring apparatus based on artificial intelligence provided in an embodiment of the present disclosure may be implemented in a software manner. FIG. 2 shows an image coloring apparatus 455 based on artificial intelligence stored in a memory 450; and the image coloring apparatus 455 based on artificial intelligence may be software in a form of a program, a plug-in or the like and includes following software modules: an acquisition module 4551, a transformation module 4552, a processing module 4553 and a training module 4554. These modules are logical and thus may be combined in any combination or further split according to achieved functions. A function of each module is described below.

FIG. 3 is a schematic diagram of a coloring system 10 according to an embodiment of the present disclosure. The coloring system 10 includes an encoder, a pre-trained GAN, a transformation network and a coloring network, where the encoder is used for acquiring an encoding vector of the image-to-be-colored; and the encoder may be a generator in the generative adversarial network, may further be an encoder portion in an automatic encoder, and may further be a convolutional neural network. The pre-trained GAN is a generator of a trained GAN and is used for generating the second colored image and the first color a priori information about the image-to-be-colored. The transformation network is used for transforming the first color a priori information based on the image-to-be-colored and the second colored image to obtain the second color a priori information. The coloring network is used for generating the first colored image based on the image-to-be-colored and the second color a priori information.

Figure 4:
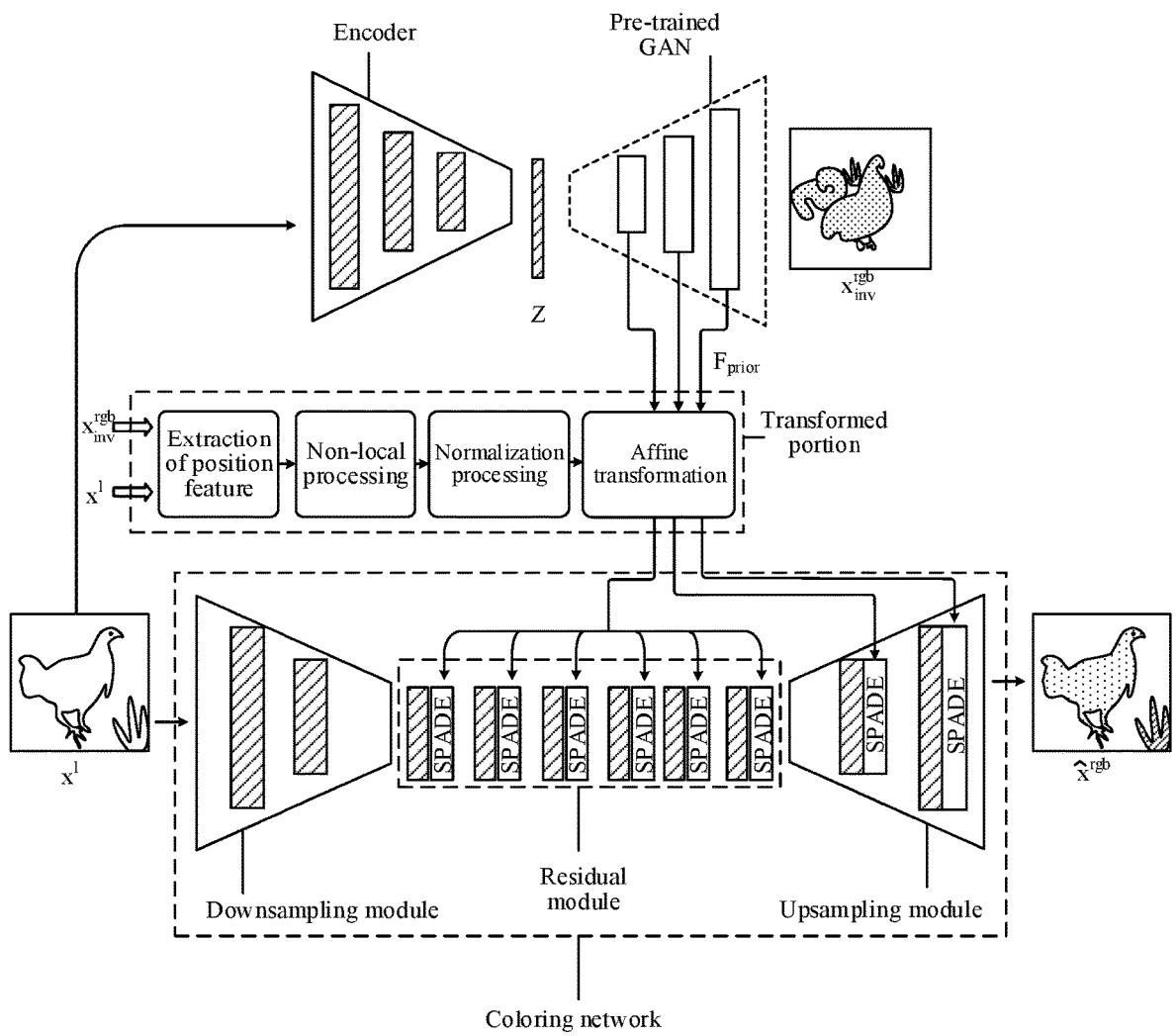
FIG. 4 is a schematic diagram of image coloring according to an embodiment of the present disclosure.

FIG. 4 is a schematic diagram of image coloring according to an embodiment of the present disclosure. As shown in FIG. 4, the coloring network includes a downsampling module, a residual module and an upsampling module. The downsampling module is composed of a plurality of downsampling layers and is configured to downsample the image-to-be-colored to obtain a first image feature. The residual module is composed of a plurality of residual blocks and is configured to perform modulation coloring processing on the first image feature based on the second color a priori information to obtain a second image feature. The upsampling module is composed of a plurality of upsampling layers and is configured to upsample the second image feature based on the second color a priori information to obtain a first colored image aligned with the image-to-be-colored.

The image coloring method based on artificial intelligence provided in the embodiments of the present disclosure is described below in conjunction with various components of the coloring system 10 described above; and an execution entity of the method described below may be a terminal or a server, and in particular, the terminal or the server may be implemented by running various computer programs described above. Certainly, it will be readily seen that the image coloring method based on artificial intelligence provided in the embodiments of the present disclosure may also be cooperatively implemented by the terminal and the server in accordance with the following understanding.

Figure 5:
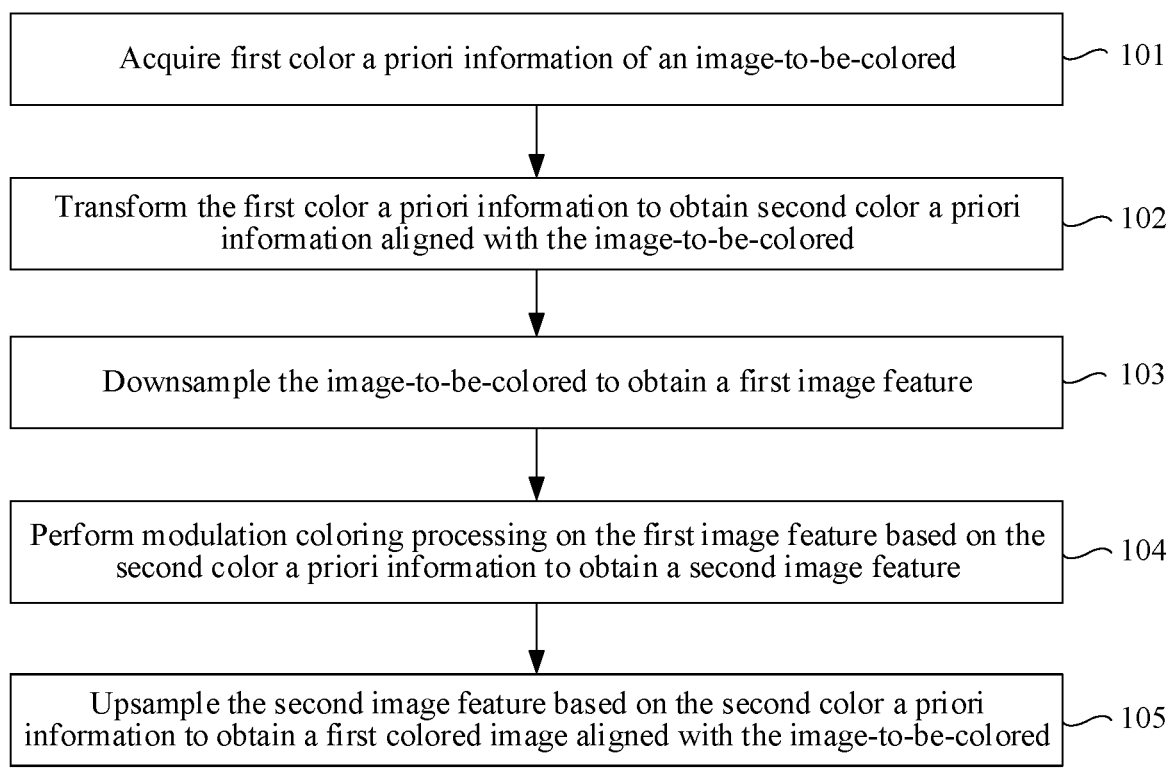
FIG. 5 is a flowchart of an image coloring method based on artificial intelligence according to an embodiment of the present disclosure.

FIG. 5 is a flowchart of an image coloring method based on artificial intelligence according to an embodiment of the present disclosure and will be described in combination with the steps shown in FIG. 5, various portions of the coloring system shown in FIG. 3 and FIG. 4.

In step 101, the first color a priori information about the image-to-be-colored is acquired.

In some embodiments, the image-to-be-colored is a grayscale image in an LAB color mode, that is, the grayscale image has a luminance channel (L) only and lacks color channels (A and B). If the image-to-be-colored is in an RGB color mode, it requires to be converted the image-to-be-colored to the LAB color mode. The first color a priori information is color a priori information related to the image-to-be-colored, for example, the color a priori information, related to the image-to-be-colored, in the pre-trained GAN, namely, an intermediate layer feature of the GAN.

In some embodiments, as shown in FIG. 4, the encoding vector for the image-to-be-colored may be acquired by the encoder first, where the encoder can be replaced with other convolutional neural networks. Then, the colored image is colored by the pre-trained GAN to obtain the second colored image. The pre-trained GAN may be a trained BigGAN or a trained StyleGAN. With the BigGAN as an example, a generator of BigGAN includes a plurality of residual blocks; the encoding vector is sent into a first residual block after being subjected to linear transformation; and each residual block includes a batch normalization (BN) layer, an activation layer and a convolutional layer. Every two residual blocks are subjected to skip connection through 1×1 convolution to achieve identical mapping to the encoding vector. Identity mapping may pass an output of a previous layer (which is also an input of a next layer) directly to an output of the next layer, so that the output of the next layer approximates its input, and then the accuracy of the output cannot be weakened in the next layer. Finally, the BigGAN generates the second colored image, where the residual blocks may also all be subjected to skip connection through non-1×1 convolution.

During the process of generating the second colored image, the sizes of feature maps corresponding to output features of the residual blocks are different, that is, the scales of the output features are different. The output features (multi-scale features) of different residual blocks are combined to obtain the first color a priori information.

By performing identity mapping processing on the encoding vector, the second colored image feature is obtained. With the multi-scale features obtained in the process as the first color a priori information, the identity mapping processing may effectively improve the output accuracy of the multi-scale features, namely, improve the acquisition accuracy of the first color a priori information, so that the image-to-be-colored is accurately colored, and then the image processing accuracy and the image processing efficiency of the electronic device are improved.

In step 102, the first color a priori information is transformed to obtain the second color a priori information aligned with the image-to-be-colored.

In some embodiments, alignment means that the positions of the same portion (corresponding to one or more pixels) in different images are consistent. For example, a plurality of pixels constituting a cocktail are positioned consistently in different images. The color a priori information is aligned with the image-to-be-colored, which is essentially that the positions of a same object in the both are consistent. Since the color a priori information is expressed in a form of the feature map, alignment between the color a priori information and the image-to-be-colored means that the positions of the same object in the image-to-be-colored and the color a priori information are consistent. However, the background portion and the foreground portion of the second colored image and the image-to-be-colored in the figures are not in one-to-one correspondence to each other, that is, positions of corresponding pixels in the two images are not aligned with each other. As shown in FIG. 4, the position of the cocktail in the second colored image is significantly different from the position of the cocktail in the image-to-be-colored. Accordingly, the multi-scale features in the first color a priori information is not in one-to-one correspondence to the corresponding image feature of the image-to-be-colored, and there is a deviation. Therefore, it is also necessary to transform the first color a priori information so as to obtain the second color a priori information aligned with the image-to-be-colored, namely, the color a priori information aligned with the corresponding image feature of the image-to-be-colored; and at this time, the corresponding colored image of the second color a priori information is aligned with the image-to-be-colored.

Figure 6:
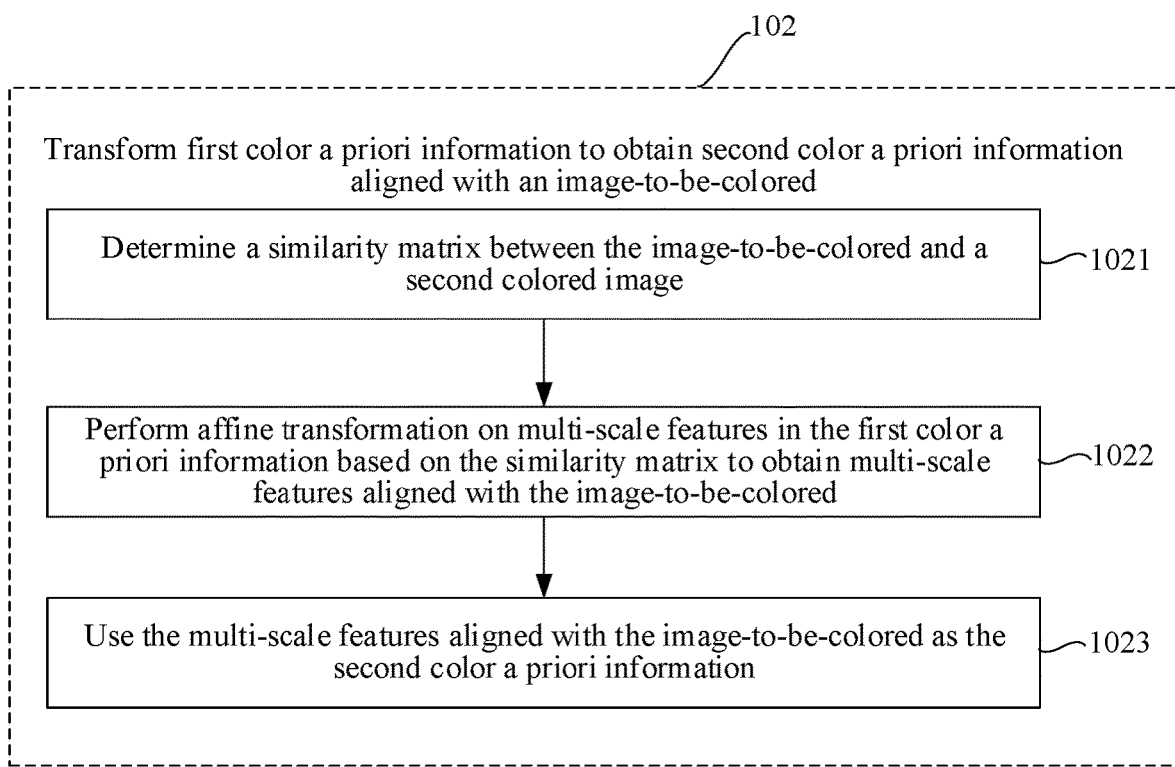
FIG. 6 is a flowchart of an image coloring method based on artificial intelligence according to an embodiment of the present disclosure.

In some embodiments, in step 102, transforming the first color a priori information to obtain the second color a priori information aligned with the image-to-be-colored is implemented through a transformation network in the coloring system 10, and the implementation process of which is shown in steps 1021-1023 of FIG. 6.

In step 1021 of determining a similarity matrix between the image-to-be-colored and the second colored image, the second colored image is obtained by coloring the image-to-be-colored and is not aligned with the image-to-be-colored.

As shown in FIG. 4, a first position feature of the image-to-be-colored and a second position feature of the second colored image may be extracted by a feature extractor separately, where the first position feature includes a position feature of each pixel point in the image-to-be-colored, and the second position feature includes a position feature of each pixel point in the second colored image. Then, non-local processing is performed on the first position feature and the second position feature to obtain the similarity matrix between the image-to-be-colored and the second colored image, where the similarity matrix includes similarity between each pixel point in the image-to-be-colored and each pixel point in the second colored image. The non-local processing is used for obtaining the similarity between one pixel point in the image-to-be-colored and any pixel point in the second colored image through calculation; and a calculation method includes dot multiplying, stitching and bilinear similarity measures, etc. When the similarity is calculated using dot multiplying, the similarity between a point in the image-to-be-colored and the corresponding position in the second colored image may be obtained by calculating a dot product of position vectors (position features) of the two positions. When the similarity is calculated by stitching, the position vectors of the corresponding positions in the two images are stitched and then sent to the perceptron to predict the similarity between the two images. Finally, the similarity matrix may be normalized by the softmax function, so that a sum of the elements in each row in the similarity matrix is 1. The obtained normalized similarity matrix serves as the similarity matrix between the image-to-be-colored and the second colored image.

Determining the similarity matrix between the image-to-be-colored and the second colored image which is not aligned with the image-to-be-colored based on the position features of the pixels may improve the accuracy of the similarity matrix, so that the image processing accuracy and image processing efficiency of the electronic device are improved.

Through non-local processing and normalization processing, global information can be introduced to improve the accuracy of the similarity matrix, and thus the image processing accuracy and the image processing efficiency of electronic devices are improved.

In step 1022, affine transformation processing is performed on the first color a priori information based on the similarity matrix to obtain the multi-scale features aligned with the image-to-be-colored.

In some embodiments, the first color a priori information includes the multi-scale features obtained during the process of coloring an image-to-be-colored; and affine transformation is performed on the multi-scale features in the first color a priori information, that is, the similarity matrix is multiplied with the multi-scale features in the first color a priori information by a matrix, so as to obtain the multi-scale features aligned with the image-to-be-colored.

In step 1023, the multi-scale features aligned with the image-to-be-colored serve as the second color a priori information.

It can be seen that the similarity matrix between the image-to-be-colored and the second colored image is obtained based on the similarity of the position feature at the position corresponding to the image-to-be-colored and the second colored image, and the second color a priori information aligned with the image-to-be-colored may be obtained by performing affine transformation on the first color a priori information via the similarity matrix, so that an accuracy guarantee is provided for subsequent generation of the first colored image aligned with the image-to-be-colored. Thus, the image processing accuracy and the image processing efficiency of the electronic device are improved.

In step 103, the image-to-be-colored is downsampled to obtain the first image feature.

In some embodiments, the image-to-be-colored is downsampled by a downsampling module in the coloring network. The downsampling module includes a plurality of downsampling layers and performs convolution processing on an input feature in each downsampling layer to obtain a corresponding image feature; and the obtained image feature represents position information, semantic information and other information of the image-to-be-colored. By pooling the obtained image feature, a corresponding pooling result is obtained and serves as an input feature of the next layer. An output of a last downsampling layer serves as the first image feature.

In step 104, the first image feature is modulation-colored based on the second color a priori information to obtain the second image feature.

In some embodiments, to achieve multi-scale control, the residual module and the upsampling module of the coloring network are controlled by the multi-scale features aligned with the image-to-be-colored. Different ones of the multi-scale features that are aligned with the image-to-be-colored correspond to different portions of the coloring network. For example, when the upsampling module of the coloring network includes two upsampling layers, there are a total of three scales of features in the multi-scale features aligned with the image-to-be-colored, corresponding to the residual module, the first upsampling layer and the second upsampling layer respectively.

In some examples, first, first modulation parameters are determined based on the multi-scale features, aligned with the image-to-be-colored, in the second color a priori information. That is, in the multi-scale features aligned with the image-to-be-colored, a first scale feature corresponding to the residual module in the coloring network is determined, and convolution processing is performed on the first scale feature to obtain the first modulation parameters corresponding to the residual module. Since a general residual module is composed of at least two residual blocks, multiple different convolutions are performed on the first scale features in parallel to obtain first modulation parameters ($\alpha$ and $\beta$, where $\alpha$ represents a weight, and $\beta$ represents a deviation) corresponding to each residual block, and a dimension of each first modulation parameter is consistent with that of a feature f-to-be-modulated in the corresponding residual block. Each residual block has multiple layers, and each layer is composed of a convolutional layer, a spatial-adaptive normalization (SPADE) layer and an activation layer. The feature f-to-be-modulated is a feature obtained by performing, by the convolutional layer in each residual block, convolution processing on the input feature thereof. For example, when there are six residual blocks in the coloring network, six different convolutions are performed on the first scale features in parallel via different convolutional neural networks to obtain six first modulation parameters corresponding to the six residual blocks: ($\alpha 1$, $\beta 1$), ($\alpha 2$, $\beta 2$), ($\alpha 3$, $\beta 3$), ($\alpha 4$, $\beta 4$), ($\alpha 5$, $\beta 5$), ($\alpha 6$, $\beta 6$), where the types of the SPADE layer and the BN layer are also used for regularization and are modulated using learned modulation parameters. Different from the BN layer, the SPADE layer is a conditional regular layer, that is, a modulation parameter thereof is obtained depending on the external; and the modulation parameter in the SPADE layer is a tensor rather than a vector in the BN layer. Compared with a common regular layer, the SPADE layer may preserve the semantic information better, so that the coloring network generates the first colored image with real texture.

Then, the first image feature is modulated and colored by the first modulation parameters to obtain the second image feature. Convolution processing is performed on the first image feature through the convolutional layer in each residual block to obtain a corresponding convolution result. In the SPADE layer, the obtained convolution is linearly transformed by the first modulation parameters. A formula (1) for linear transformation is shown as follows:

$$f'=f*\alpha+\beta \quad (1)$$

where f' is a feature obtained by modulating the feature-to-be-modulated by the first modulation parameters and is also a linear transformation result.

Modulation coloring the first image feature via the first modulation parameter, the modulation coloring process has a reference and a basis, so that the image processing accuracy and the image processing efficiency of the electronic device are improved.

By determining the first scale feature corresponding to the residual module and performing convolution processing on the first scale feature to obtain the first modulation parameters, the semantic information may be better preserved, and then the image processing accuracy and the image processing efficiency of the electronic device are improved.

In the activation layer, a first linear transformation result is mapped to a high-dimensional non-linear interval; and finally, the mapped first linear transformation result is added to the first image feature, and an obtained addition result serves as the second image feature, where when each residual block is in identity mapping, the mapped first linear transformation result is directly added to the first image feature; and when the residual block is in non-identity mapping, the first image feature is enlarged/reduced and then added to the mapped first linear transformation result. When there are multiple residual blocks, the addition result of the previous residual block is an input of a next residual block, and the addition result of the last residual block serves as the second image feature.

Through processing with the activation layer, image information in the second image features may be kept as much as possible, so that the image processing accuracy and the image processing efficiency of the electronic device are improved.

In step 105, the second image features are upsampled based on the second color a priori information to obtain the first colored image aligned with the image-to-be-colored.

In some embodiments, first, second modulation parameters are determined based on the multi-scale features, aligned with the image-to-be-colored, in the second color a priori information. That is, among the multi-scale features aligned with the image-to-be-colored, the second scale feature corresponding to the upsampling module in the coloring network are determined. For example, when the upsampling module includes two upsampling layers, there are the second scale features in the multi-scale features corresponding to the two upsampling layers. The second modulation parameters corresponding to the upsampling module are obtained by performing convolution processing on the second scale feature via the convolutional neural network.

Then deconvolution processing (namely, upsampling) is performed on the second image feature, a deconvolution processing result serves as the feature-to-be-modulated and is substituted into the formula (1) for linear transformation with the second modulation parameters together for linear transformation, so as to obtain a second linear transformation result (namely, the modulated feature); and the second linear transformation result is activated so as to obtain a predicted color image in the LAB color mode corresponding to the image-to-be-colored. In the predicted color image, there are the luminance channels in the color image-to-be-colored and further the two color channels lost in the color image-to-be-colored. By performing color mode conversion on the predicted color image, an image in a corresponding RGB color mode, namely, the first colored image aligned with the image-to-be-colored, may be obtained.

When there are a plurality of upsampling layer, a linear transformation result corresponding to a previous upsampling layer is an input of a next upsampling layer, and a linear transformation result of a last upsampling layer is the predicted color image.

Through deconvolution processing, linear transformation processing, activation processing and the color mode conversion processing, the first colored image may be accurately generated, so that the image processing accuracy and the image processing efficiency of the electronic device are improved.

By determining the second scale feature corresponding to the upsampling module and performing convolution processing on the second scale feature to obtain the second modulation parameters, the semantic information may be preserved better, so that the image processing accuracy and the image processing efficiency of the electronic device are improved.

In some embodiments, in order to obtain the colored image having a diversified coloring effect, conversion processing may be performed on the encoding vector to obtain a conversion vector. For example, the encoding vector may be controlled and modified by: adding a noise vector to the encoding vector; or when the pre-trained GAN is trained, changing a category of its input; Or finding directions associated with a color change by unsupervised learning and then changing the encoding vector in these directions. Then, third color a priori information aligned with the image-to-be-colored is determined based on the transformation vector. That is, with the conversion vector as an input vector of the pre-trained GAN, third color a priori information (namely, an intermediate layer feature of the pre-trained GAN) of the pre-trained GAN during the process of generating a corresponding colored image is acquired. Finally, modulation coloring processing is performed on the image-to-be-colored based on the third color a priori information to obtain a third colored image aligned with the image-to-be-colored; and the modulation coloring process is similar to the above-mentioned and will not be described in detail any more here, where the third colored image includes at least one of: an image obtained by coloring the background in the image-to-be-colored, an image obtained by coloring the foreground in the image-to-be-colored and an image obtained by adjusting a saturation in the image-to-be-colored.

It can be seen that the embodiments of the present disclosure may automatically generate the colored image which is vivid in color and highly aligned with an original image, may further generate colored images with different coloring effects by controlling and modifying on the encoding vector so as to achieve diversified coloring, so that the image processing accuracy and the image processing efficiency of the electronic device are improved.

In some embodiments, the pre-trained GAN is pre-trained in advance with fixed parameters. During the process of training the encoder, an error between an image feature of the colored image generated by the generator of the pre-trained GAN and an image feature of an actual colorful image corresponding to the image-to-be-colored is determined and backward propagated in the encoder to update parameters of the encoder.

After the encoder is trained, the coloring network is trained. first, a total loss function is determined based on the corresponding adversarial loss function, perception loss function, domain alignment loss function and context loss function of the coloring network, where the adversarial loss function is used for making the first colored image generated by the coloring network more realistic; the perception loss function is used for making the first colored image generated by the coloring network more realistic and reasonable in the sense; the domain alignment loss function is used for mapping the image-to-be-colored and the second colored image to a same feature space; and the context loss function is used for measuring the similarity between two unaligned images (the first colored image and the second colored image).

Then, an image sample-to-be-colored is processed by the coloring system 10 to obtain a first colored image sample that is aligned with the image sample-to-be-colored, a second colored image sample that is not aligned with the image sample-to-be-colored and a predicted color image sample. In some examples, the first colored image sample and the second colored image sample are both image samples in an RGB color mode, the predicted color image sample is an image sample in the LAB color mode, and the predicted color image sample in the LAB color mode is converted to obtain the image sample in the RGB color mode. The first colored image sample is obtained by converting the color mode of the predicted color image sample.

Thereafter, an adversarial loss value is determined based on an error between the predicted color image sample and the corresponding first actual colorful image; a perception loss value is determined based on an error between the second colored image sample and the corresponding second actual colorful image; a domain alignment loss value is determined based on an error between the image sample-to-be-colored and the second colored image sample; and a context loss value is determined based on an error between the first colored image sample and the second colored image sample.

In some examples, the first actual colorful image is a color image sample in an actual LAB color mode, corresponding to the image sample-to-be-colored; the predicted color image sample is a color image sample in the LAB color mode obtained by predicting two color channels which are lost in the image sample-to-be-colored; the second colored image sample is a colorful image sample in a predicted RGB color mode; and the second actual colorful image is a colorful image sample in an actual RGB color mode corresponding to the image sample-to-be-colored and is obtained by converting the color mode of the first actual colorful image.

After each loss value is determined, the adversarial loss value, the perception loss value, the domain-aligned loss value and the context loss value are weighted and summed to gain a total loss value. Finally, the total loss value is backward propagated in the coloring network based on the total loss function to update the parameters of the coloring network.

By weighted summation of various loss values, the coloring processing accuracy of the coloring network may be improved, so that the image processing accuracy and the image processing efficiency of the electronic device are improved.

It can be seen that, in the embodiments of the present disclosure, by determining the second color a priori information aligned with an image-to-be-colored, and performing modulation coloring processing and upsampling processing on the first image feature corresponding to the image-to-be-colored based on the second color a priori information, the first colored image is obtained. Since the second color a priori information is aligned with the image-to-be-colored, the first colored image generated based on the second color a priori information is aligned with the image-to-be-colored. Thus, the image-to-be-colored is accurately colored, and then the image processing accuracy and the image processing efficiency of the electronic device are improved.

The following describes an exemplary application of this embodiment of the present disclosure in an actual application scenario.

In a video application, the terminal sends a coloring request carrying a grayscale video file to a cloud server in response to a coloring operation of the user for the grayscale video file. After receiving the coloring request, the cloud server decodes the greyscale video file to obtain a plurality of video frames, and each video frame is an image-to-be-colored. Thereafter, a plurality of video frames (images-to-be-colored) are colored to obtain a plurality of first colored images. A plurality of first colored images are encoded to obtain a new colorful video file, and the new video file is sent to the terminal to present the new video on the terminal.

The process of coloring the video frames (images-to-be-colored) is described below. As shown in FIG. 4, first, the image-to-be-colored $x^I$ (grayscale image) is encoded by the encoder, such as a GAN encoder, to obtain the encoding vector z. Then, the second colored image $x_{inv}^{rgb}$ and the first color a priori information associated with $x^I$ (namely, the interlayer feature $F_{prior}$) are generated by receiving z by the pre-trained GAN. Since the first color a priori information is associated with $x^I$, rather than completely aligned with $x^I$ (for example, the position of the cocktail in FIG. 4 is not consistent with that of the cocktail in $x^I$), it is necessary to determine the positional correspondence therebetween through $x^l$ and $x_{inv}^{rgb}$. The similarity matrix M between $x^l$ and $x_{inv}^{rgb}$ is determined; M represents the similarity between the positions of the pixel points of the above two; and the first color a priori information aligned with $x^l$ by using M. After alignment, the second color a priori information is obtained; and partial parameters in the coloring network are controlled by the second color a priori information so as to achieve the purpose of using the color a priori information to guide coloring. Finally, the coloring network outputs the first colored image $\hat{x}^{rgb}$ based on the image-to-be-colored.

The above coloring process is specifically described below.

(a) The color a priori information associated with $x^l$ requires to be found in the pre-trained GAN. However, it is considered that the issue that relevant color a priori information is "retrieved" in the pre-trained GAN based on $x^l$ cannot be well defined and optimized, so an encoder which receives $x^l$ and outputs z is introduced; and the encoder is a neural network. After the corresponding z of $x^l$ is determined by the encoder, the pre-trained GAN receives z and outputs $x_{inv}^{rgb}$ having similar contents with $x^l$ as much as possible; and at this time, a multi-scale feature $F_{prior}$ which is composed of the features of a plurality of layers in the middle of the pre-trained GAN is the first color a priori information which is most relevant to the feature. To optimize the encoder, features of the corresponding actual colorful images $x_{rgb}$ and $x_{inv}^{rgb}$ for constraining $x^l$ in the discriminator of the pre-trained GAN require to be close as much as possible.

(b) The first color a priori information $F_{prior}$ is transformed to be aligned with $x^l$. Since $F_{prior}$ and $x^l$ are not aligned with each other spatially in general, $F_{prior}$ can better guide coloring only by requiring to align the above two first. $x^l$ and $x_{inv}^{rvb}$ pass through a same feature extractor to obtain position features corresponding to feature vectors (position features) of the two at all spatial positions; and a similarity matrix M between the two is obtained according to a dot product between the position features corresponding to $x^l$ and $x_{inv}^{rgb}$; and M(u, v) represents the similarity (the similarity between corresponding pixels) between the position u of $x^l$ and the position v of $x_{inv}^{rgb}$. The M is normalized, so as to satisfy $\Sigma_j M(i, j)=1$. Next, affine transformation is performed on $F_{prior}$ according to M to obtain second color a priori information aligned with $x^l$.

(c) The second color a priori information aligned with $x^l$ is used for guiding coloring. The coloring network is composed of two downsampling layers, six residual blocks and two upsampling layer stacked in sequence. Convolution processing is performed on the second color a priori information to obtain parameters α and β in a same dimension as the feature f-to-be-modulated; and the feature f-to-be-modulated is modulated by the parameters α and β, where a modulation formula is: f'=f*α+β, where the feature f-to-be-modulated represents an image feature obtained through convolution processing in each residual block of a coloring network and an image feature obtained through convolution processing in the upsampling layer; and f' is a modulated feature. After being modulated, the feature f-to-be-modulated enters the next layer for processing; and finally, the coloring network generates the first colored image aligned with the image-to-be-colored.

In some embodiments, the pre-trained GAN may be BigGAN (or StyleGAN), which is pre-trained on an ImageNet data set. Whole training is divided into two stages: In the first stage, the encoder is trained; and in the second stage, the entire model is trained (except for the pre-trained GAN and the encoder, it because in the second stage, the above two have already been trained and are fixed in parameter), and the loss functions employed in the second stage include the adversarial loss function, the perception loss function, the domain alignment loss function and the context loss function.

In some embodiments, for diversified coloring, different color a priori information may be used for guiding the coloring. The first color a priori information may be changed by changing z, for example, by adding a noise vector to the encoding vector, or by changing a category of an input when BigGAN (when the pre-trained GAN is BigGAN) is trained, or by finding directions relevant to the color change through unsupervised learning, and then changing z in these directions, the resulting colored image may have a different coloring effect.

Figure 7:
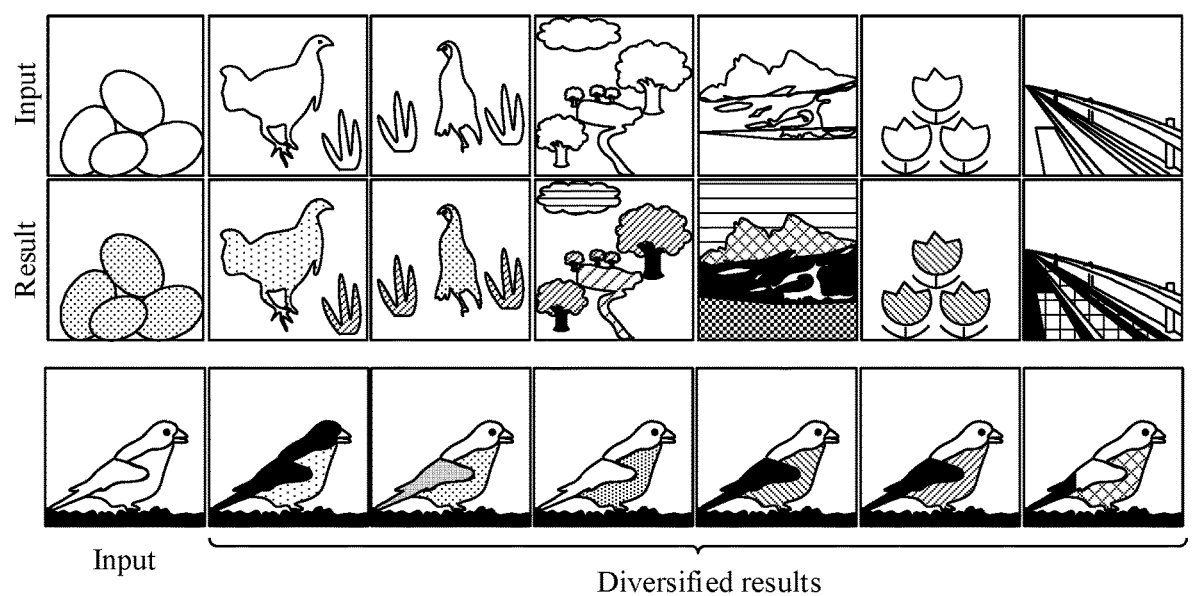
FIG. 7 is a schematic diagram of the coloring effect according to an embodiment of the present disclosure.

FIG. 7 is a schematic diagram of the coloring effect according to an embodiment of the present disclosure. In FIG. 7, a first line shows inputted images-to-be-colored; a second line shows colored images (results) obtained by the image coloring method based on artificial intelligence proposed by the embodiments of the present disclosure; and a third line shows that a grayscale image including a bird is inputted by changing the category of the bird and is colored with different colors to obtain diversified results.

Figure 8:
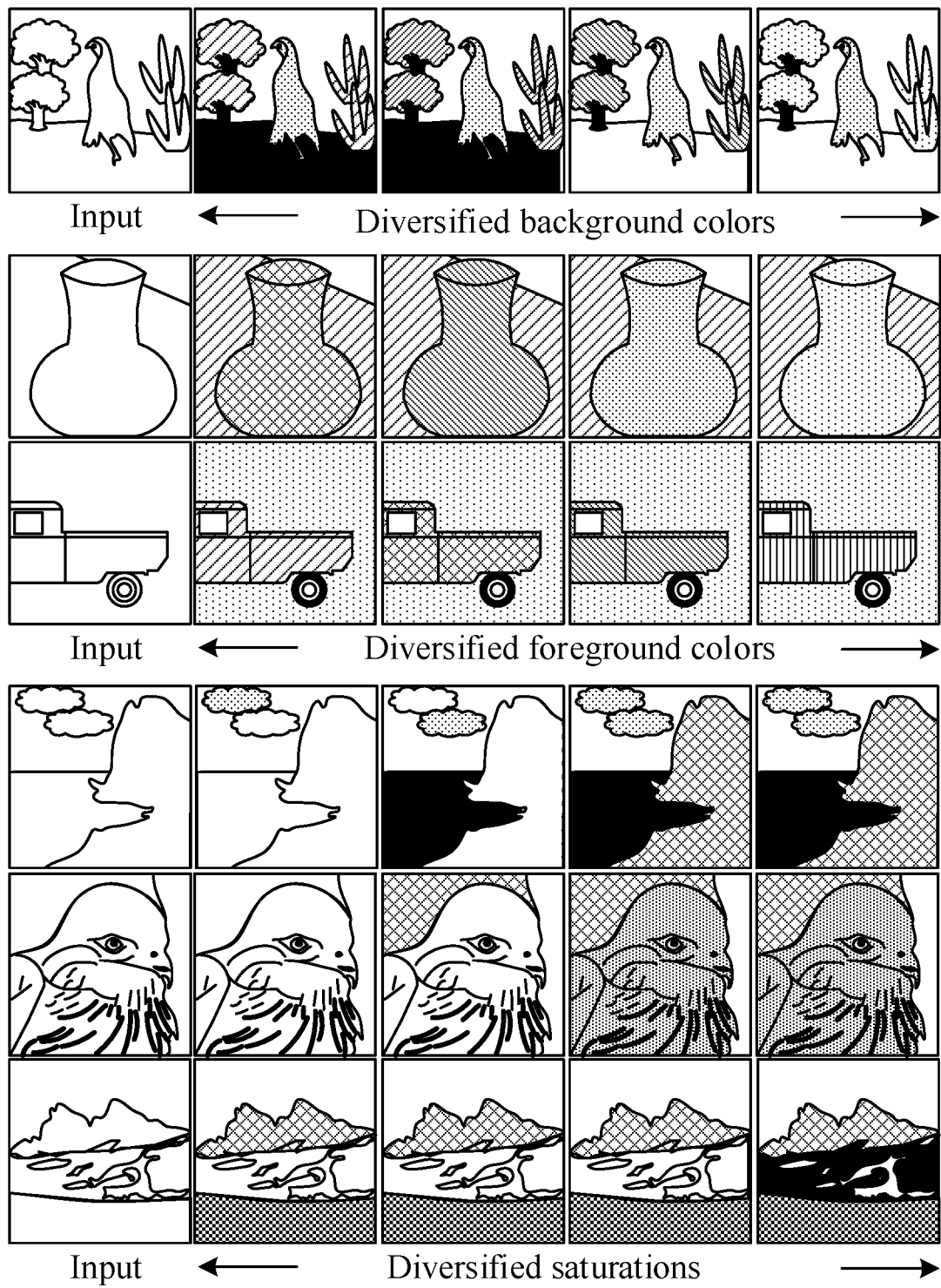
FIG. 8 is a schematic diagram of the coloring effect according to an embodiment of the present disclosure.

FIG. 8 is a schematic diagram of the coloring effect according to an embodiment of the present disclosure. FIG. 8 illustrates that z is changed in some directions to generate images with diversified coloring effects. Among these directions illustrated in FIG. 8, there are directions relevant to a background color, relevant to a foreground (such as a vase and a truck) color and relevant to a color saturation. In FIG. 8, a first line (a first image is an image-to-be-colored) shows different images obtained by coloring a background in the image-to-be-colored; a second line and a third line (first images are images-to-be-colored) show different images obtained by coloring foregrounds in the images-to-be-colored; and fourth to sixth lines (first images are images-to-be-colored) show different images obtained by adjusting saturations of the images-to-be-colored.

It can be seen that, in the embodiments of the present disclosure, the colored images with a high quality and vivid colors may be automatically and conveniently generated by guiding coloring via the color a priori information; and different coloring effects may further be achieved by controlling and modifying the color a priori information, so that diversified coloring is achieved, and then the image processing accuracy and the image processing efficiency of an electronic device are improved.

Continuing with the following description of an exemplary structure of an image coloring apparatus 455 based on artificial intelligence provided in embodiments of the present disclosure and implemented as a software module. In some embodiments, as shown in FIG. 2, the software module, stored in the memory 450, of the image coloring apparatus 455 based on artificial intelligence may include: an acquisition module 4551 configured to acquire first color a priori information about an image-to-be-colored; a transformation module 4552 configured to transform the first color a priori information so as to obtain second color a priori information aligned with the image-to-be-colored; and a processing module 4553 configured to downsample the image-to-be-colored to obtain a first image feature, configured to perform modulation coloring processing on the first image feature based on the second color a priori information so as to obtain a second image feature and configured to upsample the second image feature based on the second color a priori information to obtain a first colored image, where the first colored image is aligned with the image-to-be-colored.

In some embodiments, the acquisition module 4551 is further configured to acquire an encoding vector of the image-to-be-colored; to perform identity mapping processing on the encoding vector to obtain a second colored image, where the second colored image is not aligned with the image-to-be-colored; and to use multi-scale features as first color a priori information, where the multi-scale features are obtained during the process of obtaining the second colored image through the identity mapping.

In some embodiments, the transformation module 4552 is further configured to determine a similarity matrix between the image-to-be-colored and the second colored image, where the second colored image is obtained by coloring the image-to-be-colored, and the second colored image is not aligned with the image-to-be-colored; affine transformation processing is performed on the first color a priori information based on the similarity matrix to obtain the multi-scale features aligned with the image-to-be-colored, where the first color a priori information includes the multi-scale features obtained during the process of coloring the image-to-be-colored; and the multi-scale features aligned with the image-to-be-colored serve as the second color a priori information.

In some embodiments, the transformation module 4552 is further configured to obtain a first position feature of the image-to-be-colored and a second position feature of the second colored image, where the first position feature includes a position feature of each pixel point in the image-to-be-colored, and the second position feature includes a position feature of each pixel point in the second colored image; and to determine the similarity matrix between the image-to-be-colored and the second colored image based on the first position feature and the second position feature, where the similarity matrix includes similarity between each pixel point in the image-to-be-colored and each pixel point in the second colored image.

In some embodiments, the transformation module 4552 is further configured to perform non-local processing on the first position feature and the second position feature to obtain a similarity matrix corresponding to non-local processing; and to normalize the similarity matrix corresponding to the non-local processing to obtain the similarity matrix between the image-to-be-colored and the second colored image.

In some embodiments, the processing module 4553 is further configured to determine first modulation parameters based on the multi-scale features, aligned with the image-to-be-colored, in the second color a priori information; and to perform modulation coloring processing on the first image feature via the first modulation parameters to obtain a second image feature.

In some embodiments, the modulation coloring processing is achieved through a coloring network, and the coloring network includes a residual module; and the processing module 4553 is further configured to determine a first scale feature corresponding to the residual module in the coloring network from the multi-scale features aligned with the image-to-be-colored, and to perform convolution processing on the first scale feature to obtain first modulation parameters corresponding to the residual module.

In some embodiments, the processing module 4553 is further configured to perform convolution processing on the first image feature to obtain a convolution result; first linear transformation processing is performed on the convolution result via the first modulation parameters to obtain a first linear transformation result; and the first linear transformation result is added to the first image feature, and a resulting addition result serves as the second image feature.

In some embodiments, the processing module 4553 is further configured to determine second modulation parameters based on the multi-scale features, aligned with the image-to-be-colored, in the second color a priori information; to perform deconvolution processing on the second image feature to obtain a deconvolution result; to perform second linear transformation processing on the deconvolution processing result via the second modulation parameters to obtain a second linear transformation result; to activate the second linear transformation result to obtain a predicted color image aligned with the image-to-be-colored; and to perform color mode conversion processing on the predicted color image to obtain a first colored image.

In some embodiments, the modulation coloring processing is achieved through the coloring network, and the coloring network includes an upsampling module; and the processing module 4553 is further configured to determine the second scale feature corresponding to the upsampling module in the coloring network from the multi-scale features aligned with the image-to-be-colored and to perform convolution processing on the second scale feature to obtain second modulation parameters corresponding to the upsampling module.

In some embodiments, the processing module 4553 is further configured to perform conversion processing on the encoding vector to obtain a conversion vector; to determine third color a priori information aligned with the image-to-be-colored based on the transformation vector; and to perform modulation coloring processing on the image-to-be-colored based on the third color a priori information to obtain a third colored image aligned with the image-to-be-colored, where the third colored image includes at least one of an imaged obtained by coloring a background in an image-to-be-colored, an imaged obtained by coloring a foreground in the image-to-be-colored and an imaged obtained by adjusting a saturation of the image-to-be-colored.

In some embodiments, the downsampling processing, the modulation coloring processing and the upsampling processing are implemented through the coloring network; the image coloring apparatus based on artificial intelligence further includes a training module 4554 configured to train the coloring network by following modes of: determining a total loss function based on an adversarial loss function, a perception loss function, a domain alignment loss function and a context loss function corresponding to the coloring network; calling the coloring network to perform coloring processing on an image sample-to-be-colored to obtain a first colored image sample, a second colored image sample and a predicted color image sample, where the first colored image sample is obtained by converting the predicted color image sample and is aligned with the image sample-to-be-colored, and the second colored image sample is not aligned with the image sample-to-be-colored; determining an adversarial loss value based on an error between the predicted color image sample and a first actual colorful image corresponding to the predicted color image sample, determining a perception loss value based on an error between the second colored image sample and a second actual colorful image corresponding to the second colored image sample, determining a domain alignment loss value based on an error between the image sample-to-be-colored and the second colored image sample, and determining a context loss value based on an error between the first colored image sample and the second colored image sample, where the second actual colorful image is obtained by converting the first actual colorful image; weighting and summing the adversarial loss value, perception loss value, domain alignment loss value and context loss value to obtain a total loss value; and backward propagating the total loss value in the coloring network based on the total loss function to update parameters of the coloring network.

An embodiment of the present disclosure provides a computer-readable storage medium storing executable instructions, the executable instructions, when executed by a processor, causing the processor to perform the image coloring method based on artificial intelligence, for example, the image coloring method based on artificial intelligence as shown in FIG. 5 provided in the embodiments of the present disclosure.

In some embodiments, the storage medium may be a memory such as an FRAM, a ROM, a PROM, an EPROM, an EEPROM, a flash memory, a magnetic surface memory, an optical disk, or a CD-ROM, or may be various devices including one or any combination of the foregoing memories.

In some embodiments, the computer-executable instructions can be written in the form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts).

In an example, the executable instructions may be deployed to be executed on a computing device, or deployed to be executed on a plurality of computing devices at the same location, or deployed to be executed on a plurality of computing devices that are distributed in a plurality of locations and interconnected by using a communication network.

To sum up, in the embodiments of the present disclosure, the first colored image is obtained by determining the second color a priori information aligned with the image-to-be-colored, and performing modulation coloring processing and upsampling processing on the first image feature corresponding to the image-to-be-colored based on the second color a priori information. Since the second color a priori information is aligned with the image-to-be-colored, the first colored image generated based on the second color a priori information is also aligned with the image-to-be-colored. Thus, the image-to-be-colored is automatically and accurately colored. In addition, the embodiments of the present disclosure may further control and modify the color a priori information to generate colored images with different coloring effects, and thus diversified coloring is achieved.

The foregoing descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

What is claimed is:

1. An image coloring method based on artificial intelligence, performed by an electronic device and comprising:
    acquiring first color a priori information about an image-to-be-colored;
    transforming the first color a priori information to obtain second color a priori information aligned with the image-to-be-colored;
    downsampling the image-to-be-colored to obtain a first image feature;
    performing modulation coloring processing on the first image feature based on the second color a priori information to obtain a second image feature; and
    upsampling the second image feature based on the second color a priori information to obtain a first colored image, the first colored image being aligned with the image-to-be-colored.

2. The method according to claim 1, wherein the acquiring first color a priori information about the image-to-be-colored comprises:
    acquiring an encoding vector of the image-to-be-colored;
    performing identity mapping processing on the encoding vector to obtain a second colored image, wherein the second colored image is not aligned with the image-to-be-colored;
    using multi-scale features as the first color a priori information, wherein the multi-scale features are obtained during the identity mapping processing.

3. The method according to claim 2, further comprising:
    performing conversion processing on the encoding vector to obtain a conversion vector;
    determining third color a priori information aligned with the image-to-be-colored based on the transformation vector; and
    performing modulation coloring processing on the image-to-be-colored based on the third color a priori information to obtain a third colored image aligned with the image-to-be-colored;
    wherein the third colored image comprises at least one of: an image obtained by coloring a background in the image-to-be-colored, an image obtained by coloring a foreground in the image-to-be-colored, or an image obtained by adjusting a saturation of the image-to-be-colored.

4. The method according to claim 1, wherein the transforming the first color a priori information to obtain the second color a priori information aligned with the image-to-be-colored comprises:
    determining a similarity matrix between the image-to-be-colored and the second colored image, wherein the second colored image is obtained by coloring the image-to-be-colored and is not aligned with the image-to-be-colored;
    performing affine transformation processing on the first color a priori information based on the similarity matrix to obtain multi-scale features aligned with the image-to-be-colored, wherein the first color a priori information comprises the multi-scale features obtained during a process of coloring the image-to-be-colored; and
    using the multi-scale features aligned with the image-to-be-colored as the second color a priori information.

5. The method according to claim 4, wherein the determining the similarity matrix between the image-to-be-colored and the second colored image comprises:

acquiring a first position feature of the image-to-be-colored and a second position feature of the second colored image, wherein the first position feature comprises position features of pixel points in the image-to-be-colored, and the second position feature comprises position features of pixels point in the second colored image; and determining the similarity matrix between the image-to-be-colored and the second colored image based on the first position feature and the second position feature, wherein the similarity matrix comprises similarities between pixel points in the image-to-be-colored and pixel points in the second colored image.

6. The method according to claim 5, wherein the determining the similarity matrix between the image-to-be-colored and the second colored image based on the first position feature and the second position feature, comprises:

performing non-local processing on the first position feature and the second position feature to obtain a similarity matrix corresponding to the non-local processing; and normalizing on the similarity matrix corresponding to the non-local processing to obtain the similarity matrix between the image-to-be-colored and the second colored image.

7. The method according to claim 1, wherein the performing modulation coloring processing on the first image feature based on the second color a priori information to obtain the second image feature comprises:

determining first modulation parameters based on the multi-scale features, aligned with the image-to-be-colored, in the second color a priori information; and performing modulation coloring processing on the first image feature via the first modulation parameters to obtain the second image feature.

8. The method according to claim 7, wherein the modulation coloring processing is achieved through a coloring network, and the coloring network comprises a residual module; and the determining the first modulation parameters based on the multi-scale features, aligned with the image-to-be-colored, in the second color a priori information comprises:

determining a first scale feature, corresponding to the residual module in the coloring network, in the multi-scale features aligned with the image-to-be-colored; and performing convolution processing on the first scale feature to obtain the first modulation parameters corresponding to the residual module.

9. The method according to claim 7, wherein the performing modulation coloring processing on the first image feature via the first modulation parameters to obtain the second image feature comprises:

performing convolution processing on the first image feature to obtain a convolution result;

performing first linear transformation processing on the convolution result via the first modulation parameters to obtain a first linear transformation result; and adding the first linear transformation result and the first image feature, and using an obtained addition result as the second image feature.

10. The method according to claim 1, wherein the upsampling the second image feature based on the second color a priori information to obtain a first colored image comprises:

determining second modulation parameters based on the multi-scale features, aligned with the image-to-be-colored, in the second color a priori information;

performing deconvolution processing on the second image feature to obtain a deconvolution result;

performing second linear transformation processing on the deconvolution processing result via the second modulation parameters to obtain a second linear transformation result;

activating the second linear transformation result to obtain a predicted color image aligned with the image-to-be-colored; and performing color mode conversion processing on the predicted color image to obtain the first colored image.

11. The method according to claim 10, wherein modulation coloring processing is achieved through the coloring network, and the coloring network comprises an upsampling module; and the determining the second modulation parameters based on the multi-scale features aligned with the image-to-be-colored in the second color a priori information comprises:

determining a second scale feature, corresponding to the upsampling module in the coloring network, from the multi-scale features aligned with the image-to-be-colored; and performing convolution processing on the second scale feature to obtain second modulation parameters corresponding to the upsampling module.

12. The method according to claim 1, wherein the downsampling, the modulation coloring processing and the upsampling processing are achieved through the coloring network; and the coloring network is trained by:

determining a total loss function based on an adversarial loss function, a perception loss function, a domain alignment loss function and a context loss function corresponding to the coloring network;

calling the coloring network to perform coloring processing on an image sample-to-be-colored to obtain a first colored image sample, a second colored image sample and a predicted color image sample, wherein the first colored image sample is obtained by converting the predicted color image sample and is aligned with the image sample-to-be-colored, and the second colored image sample is not aligned with the image sample-to-be-colored;

determining an adversarial loss value based on an error between the predicted color image sample and a first actual colorful image corresponding to the predicted color image sample, determining a perception loss value based on an error between the second colored image sample and a second actual colorful image corresponding to the second colored image sample, determining a domain alignment loss value based on an error between the image sample-to-be-colored and the second colored image sample, and determining a context loss value based on an error between the first colored image sample and the second colored image sample, wherein the second actual colorful image is obtained by converting the first actual colorful image;

performing a weighted summation on the adversarial loss value, the perception loss value, the domain alignment loss value and the context loss value to obtain a total loss value; and backward propagating the total loss value in the coloring network based on the total loss function, and updating parameters of the coloring network.

13. An image coloring apparatus based on artificial intelligence, comprising:
a memory, configured to store executable instructions; and
a processor, when executing the executable instructions stored in the memory, configured to perform:
acquiring first color a priori information about an image-to-be-colored;
transforming the first color a priori information to obtain second color a priori information aligned with the image-to-be-colored;
downsampling the image-to-be-colored to obtain a first image feature;
performing modulation coloring processing on the first image feature based on the second color a priori information to obtain a second image feature; and
upsampling the second image feature based on the second color a priori information to obtain a first colored image, the first colored image being aligned with the image-to-be-colored.

14. The apparatus according to claim 13, wherein the acquiring first color a priori information about the image-to-be-colored comprises:
acquiring an encoding vector of the image-to-be-colored;
performing identity mapping processing on the encoding vector to obtain a second colored image, wherein the second colored image is not aligned with the image-to-be-colored;
using multi-scale features as the first color a priori information, wherein the multi-scale features are obtained during the identity mapping processing.

15. The apparatus according to claim 13, wherein the transforming the first color a priori information to obtain the second color a priori information aligned with the image-to-be-colored comprises:
determining a similarity matrix between the image-to-be-colored and the second colored image, wherein the second colored image is obtained by coloring the image-to-be-colored and is not aligned with the image-to-be-colored;
performing affine transformation processing on the first color a priori information based on the similarity matrix to obtain multi-scale features aligned with the image-to-be-colored, wherein the first color a priori information comprises the multi-scale features obtained during a process of coloring the image-to-be-colored; and
using the multi-scale features aligned with the image-to-be-colored as the second color a priori information.

16. The apparatus according to claim 15, wherein the determining the similarity matrix between the image-to-be-colored and the second colored image comprises:
acquiring a first position feature of the image-to-be-colored and a second position feature of the second colored image,
wherein the first position feature comprises position features of pixel points in the image-to-be-colored, and the second position feature comprises position features of pixels point in the second colored image; and
determining the similarity matrix between the image-to-be-colored and the second colored image based on the first position feature and the second position feature,
wherein the similarity matrix comprises similarities between pixel points in the image-to-be-colored and pixel points in the second colored image.

17. The apparatus according to claim 16, wherein the determining the similarity matrix between the image-to-be-colored and the second colored image based on the first position feature and the second position feature comprises:
performing non-local processing on the first position feature and the second position feature to obtain a similarity matrix corresponding to the non-local processing; and
normalizing on the similarity matrix corresponding to the non-local processing to obtain the similarity matrix between the image-to-be-colored and the second colored image.

18. The apparatus according to claim 13, wherein the performing modulation coloring processing on the first image feature based on the second color a priori information to obtain the second image feature comprises:
determining first modulation parameters based on the multi-scale features, aligned with the image-to-be-colored, in the second color a priori information; and
performing modulation coloring processing on the first image feature via the first modulation parameters to obtain the second image feature.

19. The apparatus according to claim 18, wherein the modulation coloring processing is achieved through a coloring network, and the coloring network comprises a residual module; and
the determining the first modulation parameters based on the multi-scale features, aligned with the image-to-be-colored, in the second color a priori information comprises:
determining a first scale feature, corresponding to the residual module in the coloring network, in the multi-scale features aligned with the image-to-be-colored; and
performing convolution processing on the first scale feature to obtain the first modulation parameters corresponding to the residual module.

20. A non-transitory computer-readable storage medium, storing executable instructions, the executable instructions, when executed by a processor, causing the processor to perform:
acquiring first color a priori information about an image-to-be-colored;
transforming the first color a priori information to obtain second color a priori information aligned with the image-to-be-colored;
downsampling the image-to-be-colored to obtain a first image feature;
performing modulation coloring processing on the first image feature based on the second color a priori information to obtain a second image feature; and
upsampling the second image feature based on the second color a priori information to obtain a first colored image, the first colored image being aligned with the image-to-be-colored.

* * * * *